United States Patent
Weeks (10) Patent No.: US 11,640,820 B2
(45) Date of Patent: May 2, 2023

(54) SYSTEMS AND METHODS FOR INSERTION OF FORMATTED TEXT WITH SPEECH RECOGNITION

(71) Applicant: Dolbey & Company, Inc., Cincinnati, OH (US)

(72) Inventor: Curtis A. Weeks, Loveland, OH (US)

(73) Assignee: Dolbey & Company, Inc., Cincinnati, OH (US)

( * ) Notice: Subject to any disclaimer, the term of this patent is extended or adjusted under 35 U.S.C. 154(b) by 262 days.

(21) Appl. No.: 16/936,106

(22) Filed: Jul. 22, 2020

(65) Prior Publication Data

US 2021/0027768 A1 Jan. 28, 2021

Related U.S. Application Data (60) Provisional application No. 62/877,513, filed on Jul. 23, 2019.

(51) Int. Cl.
*G10L 15/22* (2006.01)
*G10L 15/08* (2006.01)
*G06F 40/40* (2020.01)

(52) U.S. Cl.
CPC .............. *G10L 15/08* (2013.01); *G06F 40/40* (2020.01); *G10L 15/22* (2013.01); *G10L 2015/088* (2013.01); *G10L 2015/223* (2013.01)

(58) Field of Classification Search
USPC .......................... 704/200, 246, 247, 251, 252
See application file for complete search history.

(56) References Cited

U.S. PATENT DOCUMENTS

| | | | | |
|---|---|---|---|---|
| 6,298,324 B1* | 10/2001 | Zuberec | ................... | G10L 15/19 704/E15.021 |
| 2003/0171929 A1* | 9/2003 | Falcon | ..................... | G10L 15/30 704/E15.047 |
| 2012/0095765 A1* | 4/2012 | Bodin | ..................... | G10L 15/22 704/E15.005 |
| 2014/0039885 A1* | 2/2014 | Reich | ................... | H04M 3/4938 704/E15.001 |
| 2014/0039898 A1* | 2/2014 | Reich | ...................... | G10L 15/22 704/E21.001 |
| 2016/0034253 A1* | 2/2016 | Bang | ..................... | H04M 1/724 715/728 |
| 2019/0042186 A1* | 2/2019 | Weeks | ................... | G06V 30/412 |

* cited by examiner

*Primary Examiner* — Leonard Saint-Cyr
(74) *Attorney, Agent, or Firm* — Dinsmore & Shohl LLP (57) ABSTRACT

Embodiments described herein include a method for insertion of formatted text with speech recognition. One embodiment of the method includes creating a speech recognition command and executing the speech recognition command. Creating the speech recognition command may include receiving a selection by a user to add a plurality of actions to the speech recognition command and receiving a user-defined trigger command for the speech recognition command. In some embodiments, creating the speech recognition command includes receiving a definition of the text grammar, wherein the definition of the text grammar includes at least one command part and at least one command definition and storing the speech recognition command.

20 Claims, 9 Drawing Sheets

SYSTEMS AND METHODS FOR INSERTION OF FORMATTED TEXT WITH SPEECH RECOGNITION

CROSS REFERENCE

This application claims the benefit of provisional application Ser. No. 62/877,513, filed Jul. 23, 2019, which is hereby incorporated by reference in its entirety.

TECHNICAL FIELD

Embodiments described herein generally relate to systems and methods for insertion of formatted text with speech recognition and, more specifically, to using a spoken trigger command followed by variable words, letters, and/or numbers using a predefined speech grammar. Additionally, the embodiments described herein are related to performing one or more optional actions together with the insertion of formatted text.

BACKGROUND

Users of speech recognition applications often want to be able to insert text into input text areas that only expect the input in a designated format. To achieve high recognition accuracy for the desired output, the speech command grammars are often limited to the words that a user may need to say for a particular text input area. Most speech engines provide a general dictation feature where all the words spoken are converted to text and inserted at the current cursor position. This general dictation feature allows for a very broad range of words of the given language (i.e. tens of thousands of words) and may result in recognition of words not appropriate for the current text area, or may result in recognition of the correct words but written in the wrong form (i.e. "one" vs. "1" or "be" vs "B"). Additionally, the task of inserting the formatted text coupled with other steps is a process that users would like to have automated as part of the speech command.

Thus, a need exists in the industry for a mechanism for accurately providing speech recognition functionality in a proper format.

SUMMARY

Embodiments described herein include systems and methods for insertion of formatted text with speech recognition. One embodiment of a method includes creating, by a computing device, a speech recognition command. Creating the speech recognition command may include receiving a selection by a user to add a plurality of actions to the speech recognition command, where the plurality of actions includes performing a first action and inserting a text grammar and receiving a user-defined trigger command for the speech recognition command. In some embodiments, creating the speech recognition command includes receiving a definition of the text grammar, where the definition of the text grammar includes at least one command part and at least one command definition and storing the speech recognition command. Some embodiments of the method include executing, by the computing device, the speech recognition command. Executing the speech recognition command includes providing a target application interface, receiving the user-defined trigger command and associated speech, and selecting the position in the target application interface. Some embodiments include converting the associated speech into text and inserting the text at the position.

Also provided are embodiments of a system for insertion of formatted text with speech recognition. One embodiment of a system includes a computing device that includes a processor and a memory component. The memory component may be configured for storing target application logic and a speech recognition logic. The speech recognition logic, when executed by the processor causes the system to receive a selection by a user to add a plurality of actions to a speech recognition command, where the plurality of actions includes performing a first action and inserting a text grammar. The speech recognition logic may further cause the system to receive a user-defined trigger command for the speech recognition command, and receive a definition of the text grammar, where the definition of the text grammar includes at least one command part and at least one command definition. In some embodiments, the speech recognition logic causes the system to store the speech recognition command.

Also provided are embodiments of a non-transitory computer-readable medium. One embodiments causes a computing device to provide a target application interface, receive a user-defined trigger command and associated speech from a user, and determine a speech recognition command associated with the user-defined trigger command. In some embodiments, the non-transitory computer-readable medium causes the computing device to determine at least one command part and at least one command definition for the speech recognition command, determine a position in the target application interface for executing the speech recognition command, and select the position in the target application interface. In some embodiments, the non-transitory computer-readable medium causes the computing device to convert the associated speech into text according to the at least one command part and the at least one command definition and insert the text at the position.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for insertion of formatted text with speech recognition. Some embodiments allow a user to define speech recognition command, which may include a trigger command and a voice command. The trigger command may include one or more words. Upon receipt and recognition of the trigger command, these embodiments may be configured to switch to a speech grammar confined to list of expected spoken words associated with a defined output format. The audio spoken after the trigger command may be referred to as the voice command and may be processed through the determined speech grammar.

Embodiments also described herein include assigning the voice-based trigger commands to a set of defined actions. For example, a single predefined trigger command may select a button, pause for a moment, and then send a series of keystrokes. These embodiments allow for the combination of the previously described trigger command and speech grammar to perform a set of actions whereas the insertion of the text associated with the speech grammar can be performed as one of the steps of a multi-step action. Combining these two concepts provides a powerful way to automate a set of tasks that require a variable text input in a specific format. The systems and methods for insertion of formatted text with speech recognition incorporating the same are provided in more detail below.

Figure 1:
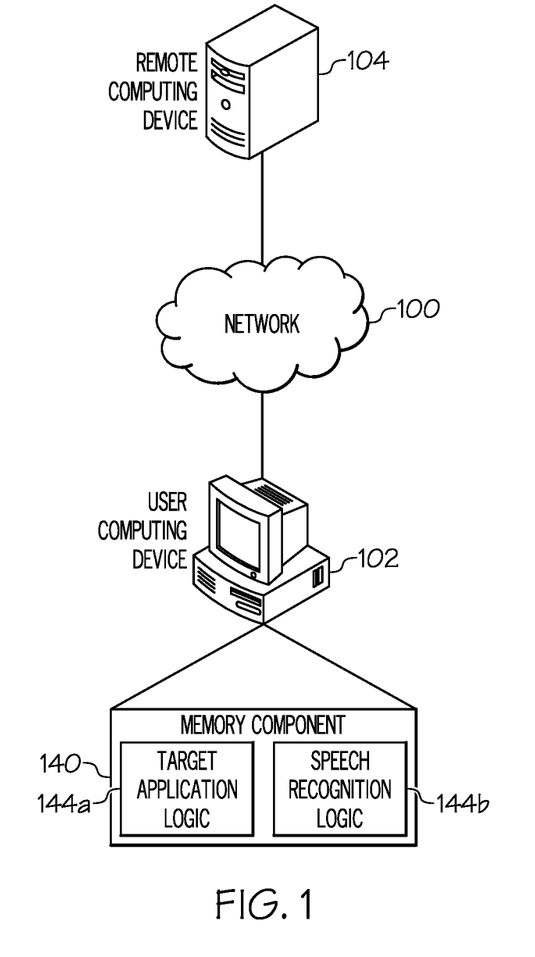
FIG. 1 depicts a computing environment for insertion of formatted text with speech recognition, according to embodiments described herein.

Referring now to the drawings, FIG. 1 depicts a computing environment for insertion of formatted text with speech recognition, according to embodiments described herein. As illustrated, the computing environment may include a network 100, such as a wide area network, (e.g., the internet, mobile data network, WiMAX, etc.), a local area network (e.g., Ethernet, Wi-Fi, etc.), and/or a peer-to-peer network (such as Bluetooth, ZigBee, etc.). The network 100 couples a user computing device 102 and a remote computing device 104. The user computing device 102 may include a personal computer, mobile device, laptop, tablet, and/or other device for providing the user interfaces, voice recognition, target application, and/or other functionality described herein. The user computing device 102 may include a memory component 140, which stores target application logic 144a and speech recognition logic 144b. The target application logic 144a represents any application or program that may be utilized by a user for inputting text or otherwise interacting that may interface with the speech recognition logic 144b. As described herein, when executed by the user computing device 102, the target application logic 144a may provide the ability for text input by a user. The target application logic 144a may require a predetermined format of text and/or the user and/or administrator may require the predetermined format for data entry. As an example, the target application logic 144a may receive a phone number, part number, and/or other specific data format. In these particular fields, the target application logic 144a may require that the input be numerical (phone number) or alpha numerical (part number), with the alphabetic characters being capitalized and the numeric characters being numerical. Similarly, when executed by the user computing device 102, the speech recognition logic 144b may cause the user computing device 102 to receive voice data, convert the voice data to text, format the text according to a predetermined format, and/or provide other actions described herein.

Also included is the remote computing device 104. The remote computing device 104 may include a server, personal computer, mobile device, laptop, tablet, or other computing device that may be configured for performing at least a portion of the functionality described herein. As such, while the user computing device 102 is depicted with the target application logic 144a and the speech recognition logic 144b, some embodiments may be configured such that at least a portion of the logic and/or functionality described herein is provided by the remote computing device 104.

Figure 2:
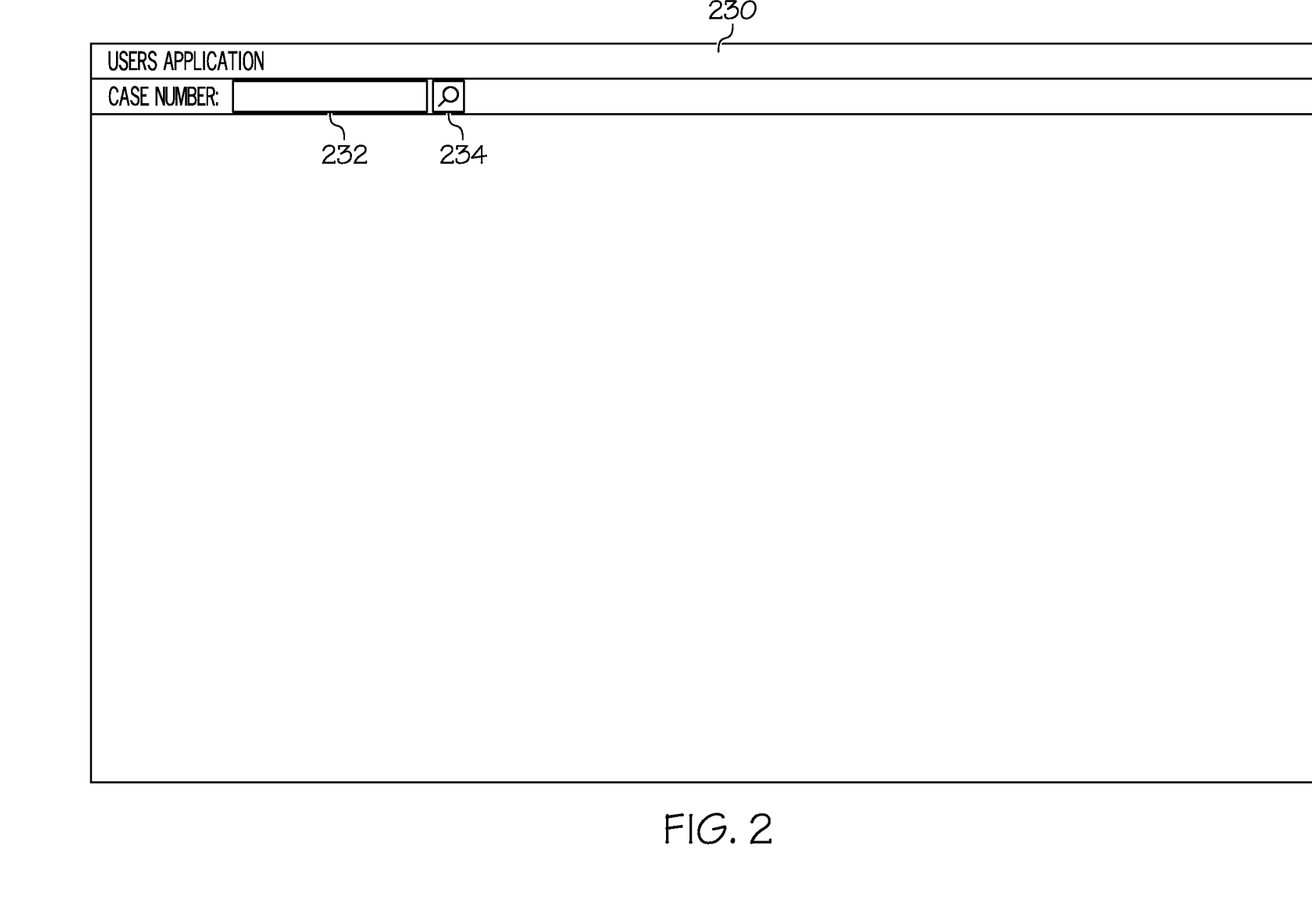
FIG. 2 depicts a user interface for target application logic that provides a user with a text area for entering text, according to embodiments described herein.

FIG. 2 depicts a user interface 230 for target application logic 144a that provides a user with a text area for entering text, according to embodiments described herein. As illustrated, the user interface 230 may provide a case number text field 232. Without the use of voice recognition, the process of loading case "B3-1" includes the user selecting the case number text field 232 to place a cursor in the case number field. The user would then type the desired case number of "B3-1." The user would then select the search option 234 to execute the search.

It would be readily understood that the user would typically be versed in the format of the case number and would type a format of speech such as "B3-1" instead of something like "bee three dash one." However, in such an example, if the user did input this incorrect format, many target applications would not be configured to properly search and identify the desired case number.

Figure 3:
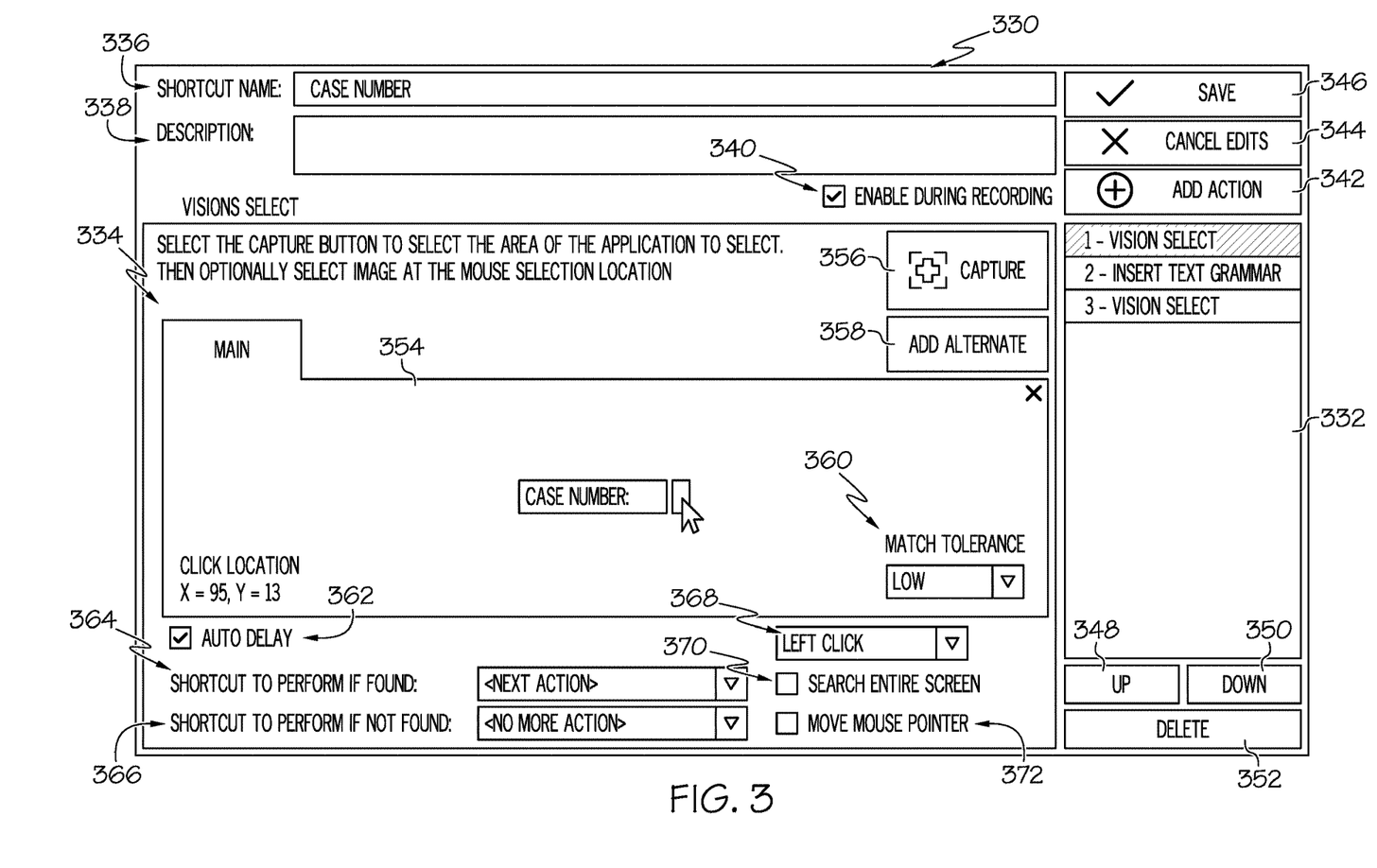
FIG. 3 depicts a user interface for simulating a user mouse action and/or other input for target application logic, according to embodiments described herein.

FIG. 3 depicts a user interface 330 for simulating a user mouse action and/or other input for target application logic 144a, according to embodiments described herein. As illustrated, the user interface 330 includes a sidebar 332 and an action definition section 334. Also provided is a shortcut name field 336, a description field 338, and an enable during recording option 340. The shortcut name field 336 may be configured to receive a user-defined name of the speech recognition command. Depending on the particular embodiment, the shortcut name provided may or may not also be the trigger command for activating the speech recognition command. The description field 338 may receive a user-defined description of the speech recognition command. In response to selection of the enable during recording option 340, the speech recognition command may be activated, even when recording a dictation.

The sidebar 332 may provide one or more command categories, such as a vision select (which may provide the ability to program a command using mouse clicks and/or other option selections), insert text grammar, etc. The sidebar 332 includes an add action option 342, a cancel edits option 344, a save option 346, an up option 348, a down option 350, and a delete option 352. Accordingly, the sidebar 332 may provide one or more options for the user to define the number and types of actions in this speech recognition command. The user may select the add action option 342 to create a new action for this speech recognition command. The user may then define the type of action to be created. Examples may include a vision select action, a keyboard shortcut action, a script action, a mouse click action, an insert text action, a launch application action, a close application action, a minimize action, a maximize action, a submit action, and/or other action that may be performed via the target application logic 144a. In response to selection of the cancel edits option 344, a change that was made may be canceled. In response to the save option 346, the edits may be saved.

Also provided in the sidebar 332 are an up option 348, a down option 350, and a delete option 352. In response to selection of the up option 348, a highlighted action may be moved up in the listing in the sidebar 332. In response to selection of the down option 350, the highlighted action may be moved down the listing in the sidebar 332. Specifically, some embodiments may be configured such that the order of actions listed in the sidebar 332 represents an order that the actions will be executed. Selection of the delete option 352 may delete the selected action from the sidebar 332.

In the action definition section 334 are an interface area 354, a capture option 356, and an add alternate option 358. By creating a vision select action from the sidebar 332, one or more user interfaces may be retrieved from the target application logic 144a. This may include providing a window (such as an iframe) that may be a live instance of the target application, a simulation of the user interfaces, and/or a screenshot of the applicable user interfaces. Regardless, the interface area 354 may depict an area on which the user desires to perform an action, such as a mouse click, right-click, and/or other action. Accordingly, in response to the selection of the capture option 356, the user may capture an image or other data from the provided interface and/or position a cursor at a position in the provided user interface that the user desires that the specified action to occur. This may be used for identifying the position that the desired action will occur. In response to selection of the add alternate option 358, the user may specify an alternate position within the captured interface, an alternate user interface may be captured, and/or an alternate action for executing may be provided.

Also provided are a match tolerance option 360, an auto delay option 362, a shortcut to perform if found option 364, a shortcut to perform if not found option 366, a selection type option 368, a search entire screen option 370, and a move mouse pointer 372. In response to selecting the match tolerance option 360, the user may be provided with one or more options (such as low, medium, high) for determining how much tolerance is afforded in the accuracy of the selection made in the interface area 354. In some embodiments, the tolerance may refer to how closely the captured user interface is to the user interface found during execution of the speech recognition command. As an example, if the size, color, or other feature is different, the selected tolerance may dictate whether that portion of the speech recognition command is executed.

In response to selection of the auto delay option 362, a determination may be made regarding delays between actions that are part of the speech recognition command. In response to selection of the shortcut to perform if found option 364, options may be provided for the user to specify actions that will be taken if the identified position is located in the target application. As an example, the next action in the sidebar 332 may be performed. Other options may be provided for the user to specify the next action for the speech recognition command to take.

In response to selecting the shortcut to perform if not found option 366, the user may specify actions to take if the position is not located. As an example, the speech recognition command may stop; the missing action may be skipped; and/or other action may be performed. In response to selection of the selection type option 368, the user may specify the action that is performed. Examples may include a left mouse click, a right mouse click, double click, click-hold, a keystroke, and/or other user input type. In response to selection of the search entire screen option 370, the entire screen of the provided user interface may be searched for the position specified. In response to selection of the move mouse pointer, the mouse cursor may be displayed moving to the specified position.

It should be understood that FIG. 3 depicts one example of a selection action that is performed prior to an insert text grammar action and the configuration and mechanics of the selection action could be from a variety of methods as part of a single or multiple steps.

Figure 4:
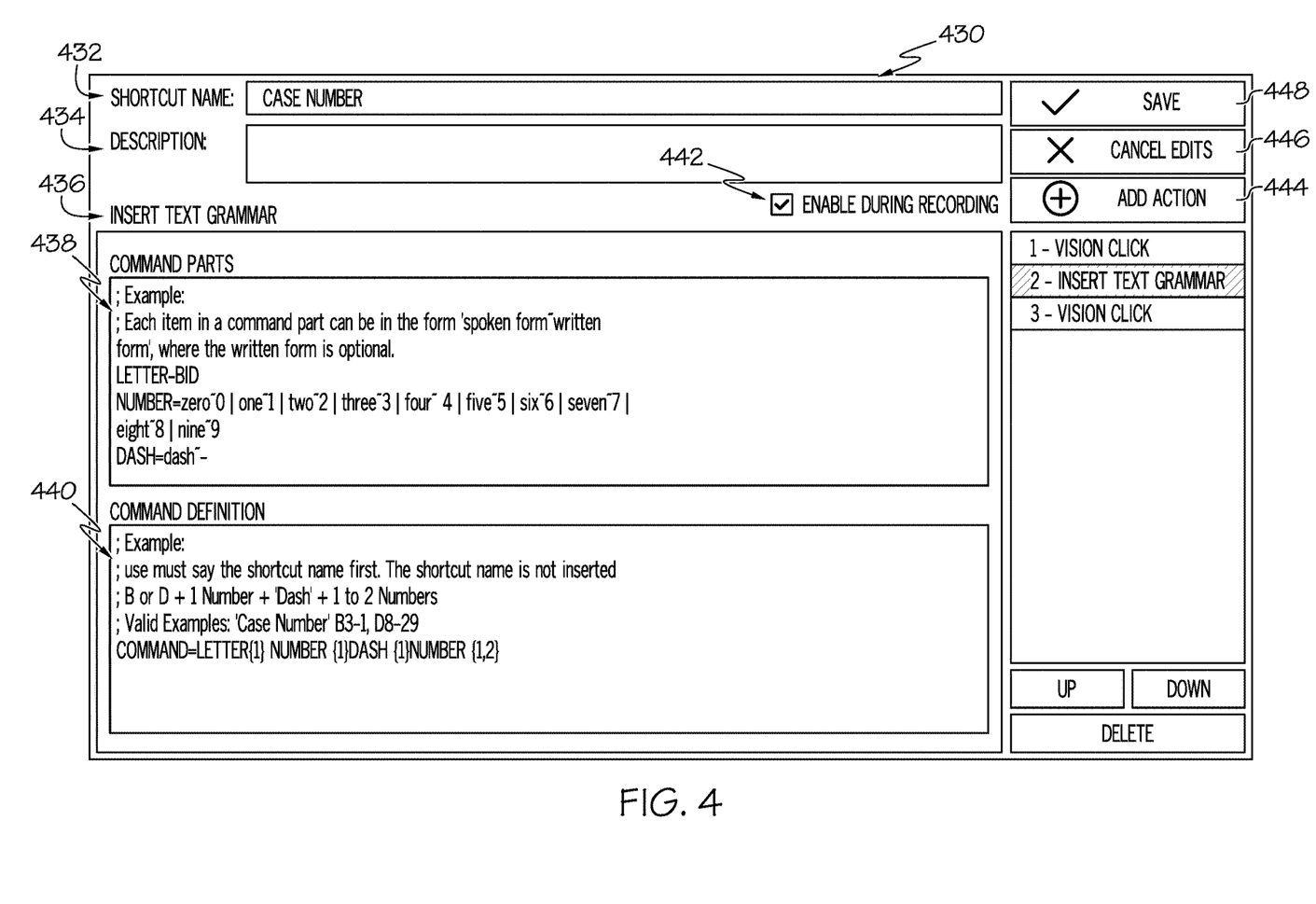
FIG. 4 depicts a user interface for inserting text from a text grammar, according to embodiments described herein.

FIG. 4 depicts a user interface 430 for inserting text from a text grammar, according to embodiments described herein. As illustrated, the user interface 430 includes a shortcut name field 432, a description field 434, and an insert text grammar section 436 that includes a first text field in the form of a command parts field 438 and a second text field in the form of a command definition field 440. The shortcut name field 432 may have been specified in FIG. 3 and may receive any text string input by a user/administrator for a later user to use as the trigger command. The description field 434 may receive any description of the text grammar. The trigger command is the initial part of the speech recognition command the user speaks to begin the speech recognition command. The trigger command is not transcribed into the target application logic 144a interface, but instead is used to begin the designated commands of the speech grammar. The speech grammar defines the expected spoken components after the trigger command.

For example, the target application logic 144a may provide an input field that requires a user to enter a case number that starts either with the letter "B" or the letter "D," followed by one number, followed by a dash, followed by one or two numbers. Examples that meet this requirement are "B3-1" and "D8-29." In order to achieve high accuracy, the speech grammar may be limited to just this set of characters. Many current speech recognition engines struggle with high accuracy for letters, because letters are typically only one syllable and many sound very similar. For example, "B" and "D" sound very similar and if spoken quickly the speech recognition engine may not be able to discern the two. This becomes more difficult when handling speakers with different accents and/or if the audio input contains noise.

In the command parts field 438, the user may provide the spoken and written forms of the available words for determining at least one classification of speech. Specifically, the spoken form defines how the word is spoken phonetically and the optional written form defines how the word is represented when inserted as text. If the optional written form is not present then the spoken form is also used as the written form. In the example below, the word "dash" is represented by the symbol "-." As illustrated in the command parts field 438 of FIG. 4, a letter may be spoken and the letter will be either "B" or "D." Then, one or more numbers may also be spoken and those numbers should be typed in numerical form. A dash may also be spoken and should be typed in the symbolic form.

The command definition field 440 provides the order of the command parts and the repetitions that make up the full voice command. As illustrated, a letter (B or D), then a single digit number, then a dash, then a single or double-digit number will be spoken.

Also included in the user interface 430 is an enable during record option 442. Specifically, embodiments described herein provide a plurality of operation modes: command mode and recording mode. While in command mode, the speech engine only recognizes from the list of spoken commands (e.g., trigger commands). In command mode, multiple voice commands can be available as well as multiple trigger commands. While in recording mode the speech engine supports the recognition of full dictation. In response to selection of the enable during record option 442, the trigger command could be recognized while in record mode as well; thus providing a hybrid of command mode and recording mode.

The user interface 430 also provides an add action option 444 for adding additional actions to this command. A close option 446 and a save option 448 are also provided.

Figure 5:
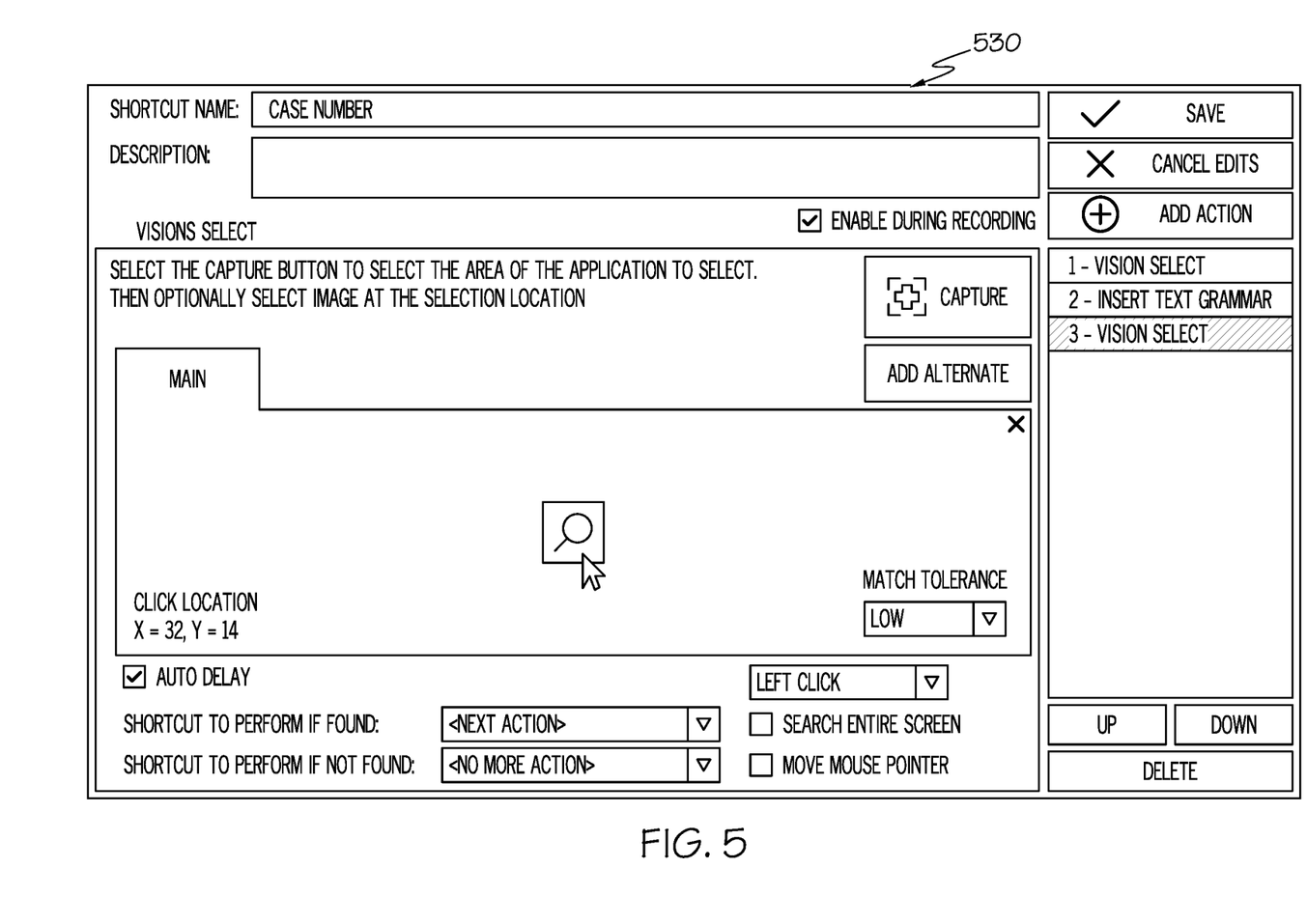
FIG. 5 depicts a user interface for simulating a selection on a search option, according to embodiments described herein.

FIG. 5 depicts a user interface 530 for simulating a selection on a search option, according to embodiments described herein. Similar to the user interface 330 of FIG. 3, the user interface 530 provides options for a vision select that correspond with the command created in FIGS. 3 and 4. In total, FIGS. 3, 4, and 5 define the actions to be performed with the spoken command for the three required steps outlined in the prior example. Additional command actions may also be created and added to the command to perform additional steps for the user.

It should be noted that the user interface 330 (FIG. 3) provides for selection of the text field 232 (FIG. 2) in the target application. In the example of FIG. 5, the user interface 530 provides for selection of the search option 234 (FIG. 2), but operates substantially similarly as the user interface 330 (FIG. 3).

It should also be noted that while FIGS. 3 and 5 depict vision selections and FIG. 4 depicts a speech recognition action, these are merely examples. Other commands to facilitate utilization of the speech recognition action of FIG. 4 may be utilized. Referring to FIGS. 3 and 5, it will be understood that while a vision selection is depicted, the configuration and mechanics of the actions could involve a variety of automation tasks that simulate a first action, such as a vision selection, a keystroke, mouse click, running a script, and/or performing other similar action.

Figure 6:
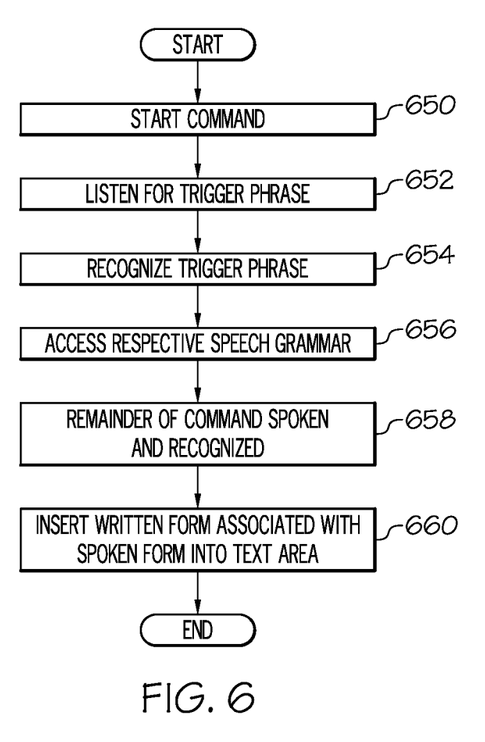
FIG. 6 depicts a flowchart for insertion of formatted text with speech recognition, according to embodiments described herein.

FIG. 6 depicts a flowchart for insertion of formatted text with speech recognition, according to embodiments described herein. As illustrated in block 650, the command mode may be started. In block 652, the speech recognition logic 144b may cause a computing device to listen for a trigger command. In block 654, a trigger command may be recognized. In block 656, the respective speech grammar may be accessed. In block 658, the remainder of the command may be spoken and recognized. In block 660, a written form associated with the spoken form may be inserted into a predetermined text area. It should be understood that other actions may also be performed before or after the text is inserted as part of this process. As an example, formatting of the text, executing of a command, and/or other actions could be performed.

Figure 7:
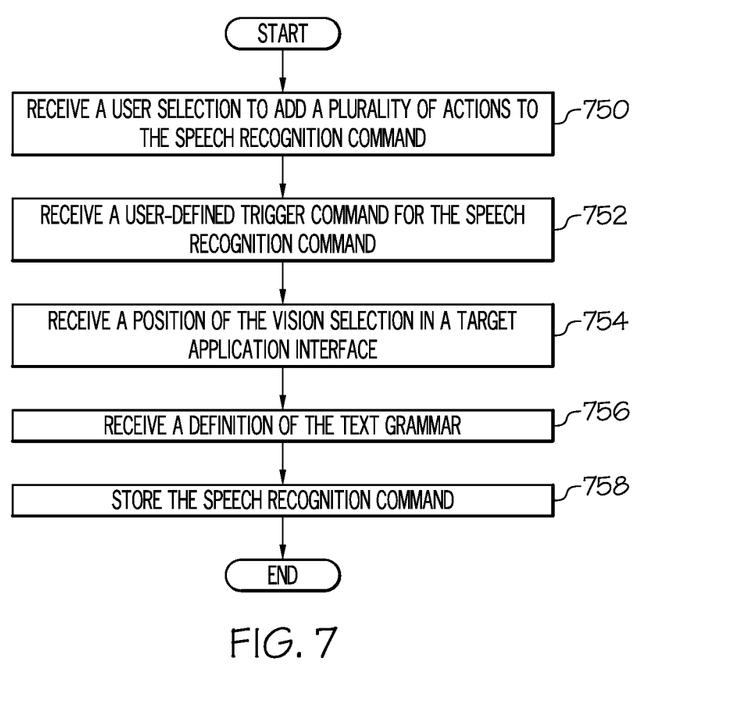
FIG. 7 depicts a flowchart for creating a speech recognition command, according to embodiments described herein.

FIG. 7 depicts a flowchart for creating a speech recognition command, according to embodiments described herein. As illustrated in block 750, a user selection to add a plurality of actions to a speech recognition command may be received, where the plurality of actions includes performing a vision selection and inserting a text grammar. As illustrated in block 752, a user-defined trigger command for the speech recognition command may be received. In block 754, a position of the vision selection in a target application interface may be received. In block 756, a definition of the text grammar may be received, where the definition of the text grammar includes at least one command part and at least one command definition. In block 758, the speech recognition command may be stored.

Figure 8:
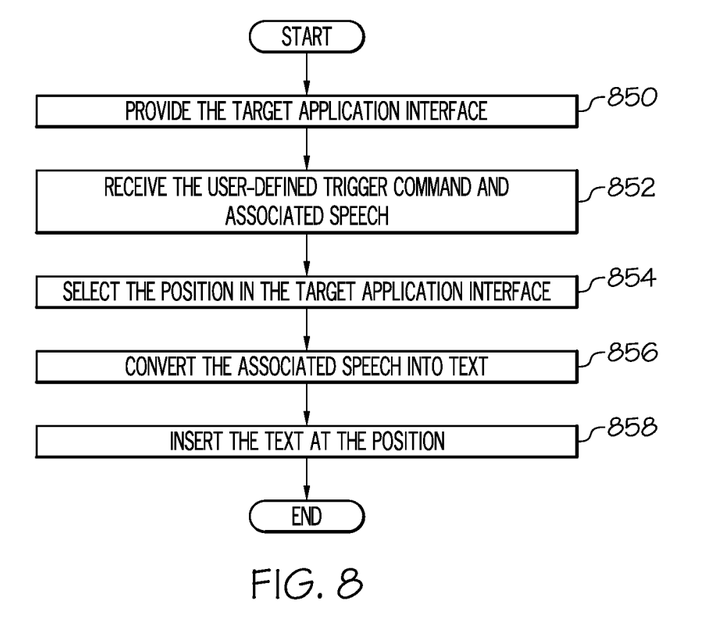
FIG. 8 depicts a flowchart for executing, by the computing device, the speech recognition command, according to embodiments described herein.

FIG. 8 depicts a flowchart for executing, by the computing device, the speech recognition command, according to embodiments described herein. As illustrated in block 850, a target application interface may be provided. In block 852, a user defined trigger command and associated speech may be received. In block 854, a position in the target application interface may be selected. In block 856, the associated speech may be converted to text. In block 858, the text may be inserted at the position. It will be understood that recognizing the voice command may include comparing the associated speech with a limited corpus of possible text strings, as defined by the at least one command part and the at least one command definition.

Figure 9:
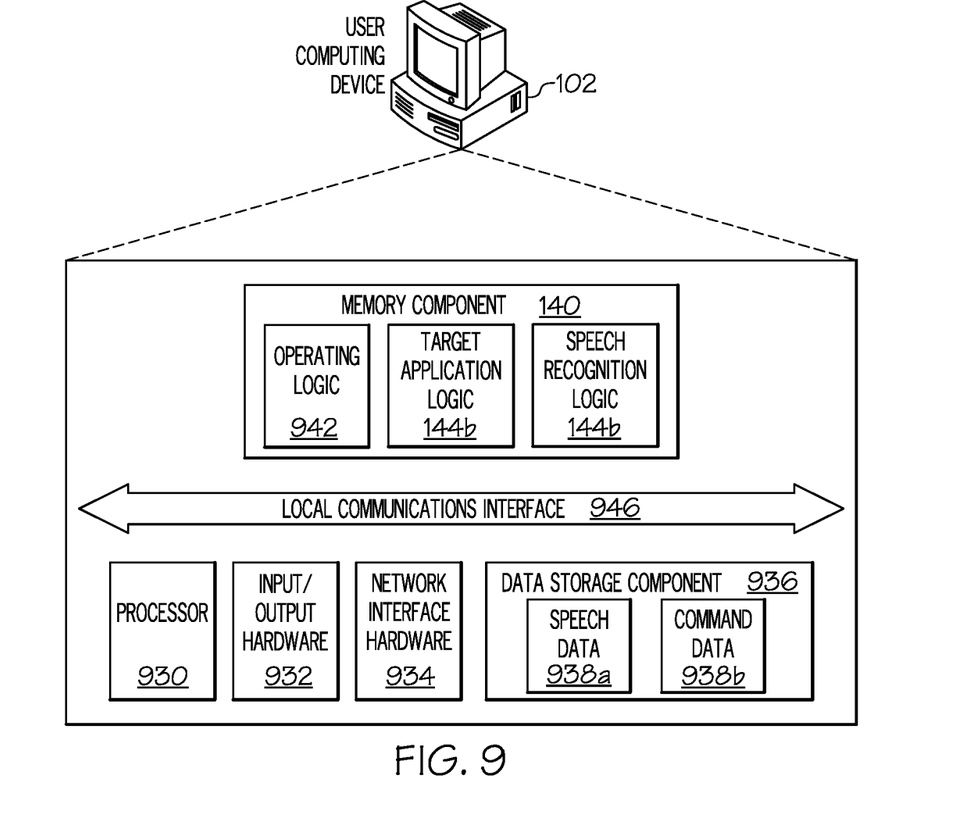
FIG. 9 depicts a user computing device for insertion of formatted text with speech recognition, according to embodiments described herein.

FIG. 9 depicts a user computing device 102 for insertion of formatted text with speech recognition, according to embodiments described herein. The user computing device 102 includes a processor 930, input/output hardware 932, the network interface hardware 934, a data storage component 936 (which stores speech data 938a, command data 938b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the user computing device 102 and/or external to the user computing device 102.

The memory component 140 may store operating logic 942, the target application logic 144a, and the speech recognition logic 144b. The target application logic 144a and the speech recognition logic 144b may each include a plurality of different pieces of logic, each of which may be embodied as a computer program, firmware, and/or hardware, as an example. A local communications interface 946 is also included in FIG. 9 and may be implemented as a bus or other communication interface to facilitate communication among the components of the user computing device 102.

The processor 930 may include any processing component operable to receive and execute instructions (such as from a data storage component 936 and/or the memory component 140). The network interface hardware 934 may include and/or be configured for communicating with any wired or wireless networking hardware, including an antenna, a modem, LAN port, wireless fidelity (Wi-Fi) card, WiMAX card, Bluetooth chip, USB card, mobile communications hardware, and/or other hardware for communicating with other networks and/or devices. From this connection, communication may be facilitated between the user computing device 102 and other computing devices, such as via the internet, to provide the functionality described herein.

The operating logic 942 may include an operating system and/or other software for managing components of the user computing device 102. As also discussed above, the target application logic 144a may reside in the memory component 140 and may be configured to cause the processor 930 provide a native application. Similarly, the speech recognition logic 144b may be utilized to provide user interfaces, as well as send content to a recipient and request a preferred content provider for the recipient device.

It should be understood that while the components in FIG. 9 are illustrated as residing within the user computing device 102, this is merely an example. In some embodiments, one or more of the components may reside external to the user computing device 102. It should also be understood that, while the user computing device 102 is illustrated as a single device, this is also merely an example. In some embodiments, the target application logic 144*a* and the speech recognition logic 144*b* may reside on different computing devices. As an example, one or more of the functionality and/or components described herein may be provided by another computing device, such as the remote computing device 104.

Additionally, while the user computing device 102 is illustrated with the target application logic 144*a* and the speech recognition logic 144*b* as separate logical components, this is also an example. In some embodiments, a single piece of logic may cause the user computing device 102 to provide the described functionality. Similarly, in some embodiments, the remote computing device 104 may be excluded.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for insertion of formatted text with speech recognition. It should also be understood that these embodiments are merely exemplary and are not intended to limit the scope of this disclosure.

What is claimed is:

1. A method for insertion of formatted text with speech recognition comprising:
    creating, by a computing device, a speech recognition command, wherein creating the speech recognition command includes:
        receiving a selection by a user to add a plurality of actions to the speech recognition command, wherein the plurality of actions includes performing a first action and inserting a text grammar;
        receiving a user-defined trigger command for the speech recognition command;
        receiving a definition of the text grammar, wherein the definition of the text grammar includes at least one command part and at least one command definition, wherein the at least one command part includes forms of available words for discerning the speech recognition command and wherein the at least one command definition provides an order of the at least one command part and repetitions that make up the speech recognition command; and
        storing the speech recognition command; and
    executing, by the computing device, the speech recognition command, wherein executing the speech recognition command includes:
        providing a target application interface;
        receiving the user-defined trigger command and associated speech;
        selecting a position in the target application interface;
        converting the associated speech into text; and
        inserting the text at the position.

2. The method of claim 1, wherein creating the speech recognition command further comprises providing a first text field to define the at least one command part, wherein defining the at least one command part includes determining at least one classification of speech that the user will provide.

3. The method of claim 1, wherein creating the speech recognition command further comprises providing a second text field to define the at least one command definition, wherein defining the at least one command definition includes determining a format of speech that the user will provide and will be converted to text.

4. The method of claim 1, wherein creating the speech recognition command further comprises providing a capture option, wherein in response to selection of the capture option, the target application interface is launched; a user selection of the position of the first action is received, and a coordinate of the position of the first action is determined.

5. The method of claim 1, wherein executing the speech recognition command further comprises comparing the associated speech with a limited corpus of possible text strings, as defined by the at least one command part and the at least one command definition.

6. The method of claim 1, wherein creating the speech recognition command further includes receiving an example command and determining the at least one command part from the example command.

7. The method of claim 1, wherein creating the speech recognition command further includes receiving an example command and determining the at least one command definition from the example command.

8. A system for insertion of formatted text with speech recognition comprising:
    a computing device that includes a processor and a memory component, the memory component storing target application logic and a speech recognition logic, the speech recognition logic, when executed by the processor causes the system to perform at least the following:
        receive a selection by a user to add a plurality of actions to a speech recognition command, wherein the plurality of actions includes performing a first action and inserting a text grammar;
        receive a user-defined trigger command for the speech recognition command;
        receive a definition of the text grammar, wherein the definition of the text grammar includes at least one command part and at least one command definition, wherein the at least one command part includes forms of available words for discerning the speech recognition command and wherein the at least one command definition provides an order of the at least one command part and repetitions that make up the speech recognition command; and
        store the speech recognition command.

9. The system of claim 8, wherein the speech recognition logic further causes the system to provide a first text field to define the at least one command part, wherein defining the at least one command part includes determining at least one classification of speech that the user will provide.

10. The system of claim 8, wherein the speech recognition logic further causes the system to provide a second text field to define the at least one command definition, wherein defining the at least one command definition includes determining a format of speech that the user will provide and will be converted to text.

11. The system of claim 8, wherein the speech recognition logic further causes the system to provide a capture option, wherein in response to selection of the capture option, a target application interface is launched; a user selection of a position of the first action is received, and a coordinate of the position of the first action is determined.

12. The system of claim 8, wherein the speech recognition logic further causes the system to execute the speech recognition command.

13. The system of claim 12, wherein executing the speech recognition command comprises:
receiving the user-defined trigger command and associated speech with a target application interface being provided to the user;
selecting a position in the target application interface;
converting the associated speech into text; and
inserting the text at the position.

14. The system of claim 8, wherein the speech recognition logic further causes the system to receive an example command and determining at least one of the following from the example command: the at least one command part or the at least one command definition.

15. A non-transitory computer-readable medium that includes logic that, when executed by a computing device, causes the computing device to perform at least the following:
provide a target application interface;
receive a user-defined trigger command and associated speech from a user;
determine a speech recognition command associated with the user-defined trigger command;
determine at least one command part and at least one command definition for the speech recognition command, wherein the at least one command part includes forms of available words for discerning the speech recognition command and wherein the at least one command definition provides an order of the at least one command part and repetitions that make up the speech recognition command;
determine a position in the target application interface for executing the speech recognition command;
select the position in the target application interface;
convert the associated speech into text according to the at least one command part and the at least one command definition; and
insert the text at the position.

16. The non-transitory computer-readable medium of claim 15, wherein the logic further causes the computing device to compare the associated speech with a limited corpus of possible text strings, as defined by the at least one command part and the at least one command definition.

17. The non-transitory computer-readable medium of claim 15, wherein the logic further causes the computing device to create the speech recognition command.

18. The non-transitory computer-readable medium of claim 17, wherein creating the speech recognition command further comprises providing a first text field to define the at least one command part, wherein defining the at least one command part includes determining at least one classification of speech that the user will provide.

19. The non-transitory computer-readable medium of claim 17, wherein creating the speech recognition command further comprises providing a second text field to define the at least one command definition, wherein defining the at least one command definition includes determining a format of speech that the user will provide and will be converted to text.

20. The non-transitory computer-readable medium of claim 17, wherein creating the speech recognition command further comprises providing a capture option, wherein in response to selection of the capture option, the target application interface is launched; a user selection of the position of a first action is received, and a coordinate of the position of the first action is determined.

* * * * *